United States Patent [19]

Miyata et al.

[11] Patent Number: 5,045,239

[45] Date of Patent: Sep. 3, 1991

[54] NON-LINEAR OPTICAL MATERIAL

[75] Inventors: Seizo Miyata, Hoya; Toshiyuki Watanabe, Higashikurume; Yoshitaka Goto, Tsukuba; Akio Hayashi, Tsukuba; Masaharu Nakayama, Tsukuba, all of Japan

[73] Assignee: Nippon Oil and Fats Co., Ltd., Tokyo, Japan

[21] Appl. No.: 362,464

[22] PCT Filed: Jul. 22, 1988

[86] PCT No.: PCT/JP88/00740

§ 371 Date: Mar. 17, 1989

§ 102(e) Date: Mar. 17, 1989

[87] PCT Pub. No.: WO89/01181

PCT Pub. Date: Feb. 9, 1989

[30] Foreign Application Priority Data

Jul. 23, 1987 [JP] Japan .................. 62-182317
Oct. 14, 1987 [JP] Japan .................. 62-257230

[51] Int. Cl.$^5$ .......................... F21V 9/00; G02B 5/02; G03C 1/00; G02F 1/01
[52] U.S. Cl. .................. 252/582; 252/589; 252/600; 359/240; 359/328
[58] Field of Search .............. 252/582, 589, 600; 350/353

[56] References Cited

U.S. PATENT DOCUMENTS 4,892,681 1/1990 Miyata et al. ................ 252/582

FOREIGN PATENT DOCUMENTS

013960 8/1980 European Pat. Off. .
051819 5/1982 European Pat. Off. .
2045056 12/1971 Fed. Rep. of Germany .
2502490 7/1975 Fed. Rep. of Germany .

Primary Examiner—John S. Maples
Assistant Examiner—Philip Tucker
Attorney, Agent, or Firm—Jordan and Hamburg

[57] ABSTRACT

A non-linear optical material comprises a derivative of chalcone represented by the following general formulae (I) or (II) of:

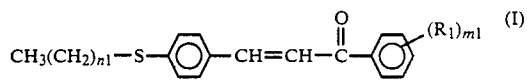

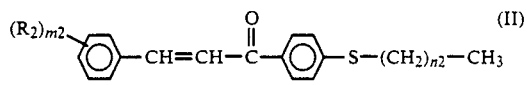

wherein $R_1$ and $R_2$ each represent a halogen atom, a hydroxyl group, an amino group, a dimethylamino group, a nitro group, a cyano group, a phenyl group, an acetyl group, an alkyl group having 1 to 18 carbon atoms or an alkyloxy group having 1 to 22 carbon atoms; $n_1$ and $n_2$ each represent an interger of from 0 to 21; and $m_1$ and $m_2$ each represent an integer of from 0 to 5.

4 Claims, 1 Drawing Sheet

NON-LINEAR OPTICAL MATERIAL

BACKGROUND OF THE INVENTION

The present invention relates to a non-linear optical material comprising a derivative of chalcone.

Non-linear optical materials are the materials exhibiting so-called non-linear optical effects, in which non-linear responses result from induced polarization of electrons by the electric field created by the light incident to the materials, such effects being generally due to the second and higher order terms in the following equation of:

$$P = \kappa^{(1)}E + \kappa^{(2)}E \cdot E + \kappa^{(3)}E \cdot E \cdot E + \cdots + \kappa^{(n)}E \cdot n$$

wherein P is polarizability of a material, E is intensity of electric field, and $\kappa^{(n)}$ is non linear sensitivity of the n-th order.

It has been known that due to a phenomenon known as the second harmonic generation (SHG) obtained by the specific utilization of the secondary effect, an incident light is converted into a light wave corresponding to the second harmonic wave and having a frequency twice as high as the frequency of the incident light or the refractive index is changed by voltage, so that the phenomenon is very conveniently utilized for performing various optical processings including conversion of wave lengths, processing of signals and modulation of laser beams, which are extremely advantageous.

Although inorganic crystals, such as $KH_2PO_4$ (KDP). $LiNbO_3$, or $NH_4H_2PO_4$ (ADP), have hitherto been used as the non-linear optical materials, they have disadvantages that single crystals having high optical purities are very expensive, that they are so deliquescent as to be inconvenient in handling, and that the non-linear sensitivities thereof are not so high. On the other hand, since the utility of organic materials was suggested in 1983 in the symposium in the American Chemical Society, organic crystals of urea, aniline base compounds or the like were reported to be utilizable as non-linear optical materials. However, these organic compounds do not exhibit satisfactory non-linear optical effect, or the compounds which exhibit a relatively high level of non-linear effect have a disadvantage that they have light absorptive terminal groups that are significantly shifted to the long wavelength range to thus limit the wavelength range of the light waves which can be processed therethrough.

SUMMARY OF THE INVENTION

An object of the present invention is to provide a non-linear optical material comprising a derivative of chalcone, which is excellent in transmittance and transparency and exhibits exceedingly high non-linear effect.

According to the present invention, there is provided a non-linear optical material comprising a derivative of chalcone represented by the following general formula (I) of:

wherein $R_1$ is a halogen atom, a hydroxyl group, an amino group, a dimethylamino group, a nitro group, a cyano group, a phenyl group, an acetyl group, an alkyl group having 1 to 18 carbon atoms or an alkyloxy group having 1 to 22 carbon atoms; $n_1$ is an integer of from 0 to 21; and $m_1$ is an integer of from 0 to 5.

Also provided by the present invention is a non-linear optical material comprising a derivative of chalcone represented by the following general formula (II)

wherein $R_2$ is a halogen atom, a hydroxyl group, an amino group, a dimethylamino group, a nitro group, a cyano group, a phenyl group, an acetyl group, an alkyl group having 1 to 18 carbon atoms or an alkyloxy group having 1 to 22 carbon atoms; $n_2$ is an integer of from 0 to 21; and $m_2$ is an integer of from 0 to 5.

DESCRIPTION OF THE PREFERRED EMBODIMENTS

The present invention will be described in detail below.

In the following general formula (I) of:

used in the present invention, $R_1$ is a halogen atom, a hydroxyl group, an amino group, a dimethylamino group, a nitro group, a cyano group, a phenyl group, an acetyl group, an alkyl group having 1 to 18 carbon atoms or an alkyloxy group having 1 to 22 carbon atoms; $n_1$ is an integer of from 0 to 21; and $m_1$ is an integer of from 0 to 5.

In the following general formula (II) of:

used in the present invention, $R_2$ is a halogen atom, a hydroxyl group, an amino group, a dimethylamino group, a nitro group, a cyano group, a phenyl group, an acetyl group, an alkyl group having 1 to 18 carbon atoms or an alkyloxy group having 1 to 22 carbon atoms; $n_2$ is an integer of from 0 to 21; and $m_2$ is an integer of from 0 to 5. Compounds represented by the formulae wherein $n_1$ and $n_2$ are not less than 22 cannot be used because of the difficulty in production thereof; and compounds represented by the formulae wherein $R_1$ and $R_2$ are alkyl groups each having not less than 19 carbon atoms or alkyloxy groups each having not less than 23 carbon atoms cannot be used likewise because of the difficulty in production thereof.

The derivatives of chalcone used in the present invention as the non-linear optical materials and represented by the general formulae (I) or (II) set forth above may be prepared through condensation reactions in the presence of a basic or acidic catalyst, for example, by reacting derivatives of thiobenzaldehyde, such as 4-methylthiobenzaldehyde, 4-ethylthiobenzaldehyde or 4-propylthiobenzaldehyde, with acetophenone or derivatives thereof for the compounds represented by the general formula (I), and by reacting derivatives of thioacetophenone such as 4-methylthioacetophenone, 4-ethylthioacetophenone or 4-propylthioacetophenone, with benzaldehyde or derivatives thereof for the compounds represented by the general formula (II). For example, sodium hydroxide, potassium hydroxide and various quaternary ammonium salts may be used as the basic catalysts, and boron trifluoride, phosphorus oxychloride and boron trifluoride etherate may be used as the acidic catalysts. In addition, it is preferred that a proper solvent, for example alcohols such as methanol or ethanol may be used to proceed the condensation reaction at a temperature range within 0° to 50° C. for 30 minutes to 10 hours. When the reaction temperature becomes higher than 50° C. during the reaction, various side-reactions take place and when the reaction temperature becomes lower than 0° C., the reaction time is exceedingly prolonged, both being considered to be undesirable.

Preferred derivatives of chalcone obtained according to this invention and represented by the general formula (I) include, for example, 4-methylthiochalcone, 4-methylthio-4'-chlorochalcone, 4-methylthio-4'-bromochalcone, 4-methylthio-4'-hydroxychalcone, 4-methylthio-4'-nitrochalcone, 4-methylthio-4'-aminochalcone, 4-methylthio-4'-dimethylaminochalcone, 4-methy-4'-methylchalcone, 4-methylthio-4'-ethylchalcone, 4-methylthio-4'-butylchalcone, 4-methylthio 4'-hexylchalcone, 4-methylthio-4'-octylchalcone, 4-methylthio-4'-decylchalcone, 4-methylthio-4'-dodecylchalcone, 4-methylthio-4'-tetradecylchalcone, 4-methylthio-4'-hexadecylchalcone, 4-methylthio-4'-octadecylchalcone, 4-methylthio-4'-methoxychalcone, 4-methylthio-4'-ethoxychalcone, 4-methylthio-4'-butoxychalcone, 4-methylthio-4'-hexyloxychalcone, 4-methylthio-4'-octyloxychalcone, 4-methylthio-4'-decyloxychalcone, 4-methylthio-4'-dodecyloxychalcone, 4-methylthio-4'-tetradecyloxychalcone, 4-methylthio-4'-hexadecyloxychalcone, 4-methylthio-4'-octadecyloxychalcone, 4-methylthio-3'-chlorochalcone, 4-methylthio-3'-bromochalcone, 4-methylthio-3'-hydroxychalcone, 4-methylthio-3'-nitrochalcone, 4-methylthio-3'-aminochalcone, 4-methylthio-3'-dimethylaminochalcone, 4-methylthio-3'-methylchalcone, 4-methylthio-3'-ethylchalcone, 4-methylthio-3'-butylchalcone, 4-methylthio-3'-hexylchalcone, 4-methylthio-3'-octylchalcone, 4-methylthio-3'-decylchalcone, 4-methylthio-3'-dodecylchalcone, 4-methylthio-3'-tetradecylchalcone, 4-methylthio-3'-hexadecylchalcone, 4-methylthio-3'-octadecylchalcone, 4-methylthio-3'-methoxychalcone, 4-methylthio-3'-ethoxychalcone, 4-methylthio-3'-butoxychalcone, 4-methylthio-3'-hexyloxychalcone, 4-methylthio-3'-octyloxychalcone, 4-methylthio-3'-decyloxychalcone, 4-methylthio-3'-dodecyloxychalcone, 4-methylthio-3'-tetradecyloxychalcone, 4-methylthio-3'-hexadecyloxychalcone, 4-methylthio-3'-octadecyloxychalcone, 4-methylthio-4'-fluorochalcone, 4-methylthio-3',4'-dichlorochalcone, 4-methylthio-4'-nonylchalcone, 4-methylthio-4'-t-butylchalcone, 4-ethylthio-4'-fluorochalcone, 4-ethylthio-4'-chlorochalcone, 4-ethylthio-4'-bromochalcone, 4-ethylthio-3'-bromochalcone, 4-ethylthio-4'-iodochalcone, 4-butylthio-4'-bromochalcone, 4-butylthio-4'-iodochalcone, 4-octylthio-4'-chlorochalcone and 4-octadecylthio-4'-bromochalcone.

Preferred derivatives of chalcone obtained according to this invention and represented by the general formula (II) include, for example, 4'-methylthiochalcone, 3-methyl-4'-methylthiochalcone, 3-chloro-4'-methylthiochalcone, 2,4-dichloro-4'-methylthiochalcone, 2,5-dichloro-4'-methylthiochalcone, 3,4-dichloro-4'-methylthiochalcone, 2,3,4-trichloro-4'-methylthiochalcone, 3,4,5-trichloro-4'-methylthiochalcone, 2,4,6-trichloro-4'-methylthiochalcone, 2,3,4,5-tetrachloro-4'-methylthiochalcone, 2,3,4,5,6-pentachloro-4'-methylthiochalcone, 2-fluoro-4'-methylthiochalcone, 3-fluoro-4'-methylthiochalcone, 4-fluoro-4'-methylthiochalcone, 2,3-difluoro-4'-methylthiochalcone, 3,4-difluoro-4'-methylthiochalcone, 2,5-difluoro-4'-methylthiochalcone, 3,5-difluoro-4'-methylthiochalcone, 2,4-difluoro-4'-methylthiochalcone, 2,6-difluoro-4'-methylthiochalcone, 2,3,4-trifluoro-4'-methylthiochalcone, 3,4,5-trifluoro-4'-methylthiochalcone, 2,4,6-trifluoro-4'-methylthiochalcone, 2,3,5-trifluoro-4'-methylthiochalcone, 2,3,6-trifluoro-4'-methylthiochalcone, 2,3,4,5-tetrafluoro-4'-methylthiochalcone, 2,3,4,6-tetrafluoro-4'-methylthiochalcone, 2,3,5,6-tetrafluoro-4'-methylthiochalcone, 2,3,4,5,6-pentafluoro-4'-methylthiochalcone, 2-bromo-4'-methylthiochalcone, 3-bromo-4'-methylthiochalcone, 4-bromo-4'-methylthiochalcone, 2,4-dibromo-4'-methylthiochalcone, 2,5-dibromo-4'-methylthiochalcone, 3,4-dibromo-4'-methylthiochalcone, 2,3,4-tribromo-4'-methylthiochalcone, 3,4,5-tribromo-4'-methylthiochalcone, 2,4,6-tribromo-4'-methylthiochalcone, 2,3,4,5-pentabromo-4'-methylthiochalcone, 2-iodo-4'-methylthiochalcone, 3-iodo-4'-methylthiochalcone, 4-iodo-4'-methylthiochalcone, 2,3-diiodo-4'-methylthiochalcone, 2,4-diiodo-4'-methylthiochalcone, 3,4-diiodo-4'-methylthiochalcone, 3,5-diiodo-4'-methylthiochalcone, 2,3,4-triiodo-4'-methylthiochalcone, 3,4,5-triiodo-4'-methylthiochalcone, 2,4,6-triiodo-4'-methylthiochalcone, 3-hydroxy-4'-methylthiochalcone, 4-hydroxy-4'-methylthiochalcone, 2,3-dihydroxy-4'-methylthiochalcone, 2,4-dihydroxy-4'-methylthiochalcone, 2,5-dihydroxy-4'-methylthiochalcone, 2,6-dihydroxy-4'-methylthiochalcone, 3,4-dihydroxy-4'-methylthiochalcone, 2,3,4-trihydroxy-4'-methylthiochalcone, 2,3,5-trihydroxy-4'-methylthiochalcone, 2,3,6-trihydroxy-4'-methylthiochalcone, 2,4,5-trihydroxy-4'-methylthiochalcone, 2,4,6-trihydroxy-4'-methylthiochalcone, 3,4,5-trihydroxy-4'-methylthiochalcone, 2,3,4,5-tetrahydroxy-4'-methylthiochalcone, 2,3,4,6-tetrahydroxy-4'-methylthiochalcone, 2,3,5,6-tetrahydroxy-4'-methylthiochalcone, 2,3,4,5,6-pentahydroxy-4'-methylthiochalcone, 3-methoxy-4'-methylthiochalcone, 3-dimethylamino-4'-methylthiochalcone, 3-octadecyl-4'-methylthiochalcone, 2,6-dimethoxy-4'-methylthiochalcone, 3-cyano-4'-methylthiochalcone, 3-methyl-4'-ethylthiochalcone, 2,3-dimethyl-4'-ethylthiochalcone, 2,4-dimethyl-4'-ethylthiochalcone, 2,5-dimethyl-4'-ethylthiochalcone, 2,6-dimethyl-4-ethylthiochalcone, 3,4-dimethyl-4'-ethylthiochalcone, 3,5-dimethyl-4'-ethylthiochalcone, 2,3,4-trimethyl-4'-ethylthiochalcone, 2,3,5-trimethyl-4'-ethylthiochalcone, 2,4,5-trimethyl-4'-ethylthiochalcone, 2,4,6-trimethyl-4'- ethylthiochalcone, 2,3,4,5-tetramethyl-4'-ethylthiochalcone, 2-ethyl-4'-ethylthiochalcone, 3-ethyl-4'-ethylthiochalcone, 4-ethyl-4'-ethylthiochalcone, 2,3-diethyl-4'-ethylthiochalcone, 2,4-diethyl-4'-ethylthiochalcone, 2,5-diethyl-4'-ethylthiochalcone, 3,4-diethyl-4'-ethylthiochalcone, 3,5-diethyl-4'-ethylthiochalcone, 2,3,4-triethyl-4'-ethylthiochalcone, 2,3,5-triethyl-4'-ethylthiochalcone, 3,4,5-triethyl-4'-ethylthiochalcone, 2-propyl-4-ethylthiochalcone, 3-propyl-4-ethylthiochalcone, 4-propyl-4'-ethylthiochalcone, 2,3-dipropyl-4'-ethylthiochalcone, 2,4-dipropyl-4'-ethylthiochalcone, 3,5-dipropyl-4'-ethylthiochalcone, 3,4,5-tripropyl-4'-ethylthiochalcone, 2-butyl-4'-ethylthiochalcone, 3-butyl-4'-ethylthiochalcone, 4-butyl-4'-ethylthiochalcone, 2,4-dibutyl-4'-ethylthiochalcone, 2-pentyl-4'-ethylthiochalcone, 3-pentyl-4'-ethylthiochalcone, 4-pentyl-4'-ethylthiochalcone, 2-hexyl-4'-ethylthiochalcone, 3-hexyl-4'-ethylthiochalcone, 4-hexyl-4'-ethylthiochalcone, 2-amino-4'-ethylthiochalcone, 3-amino-4'-ethylthiochalcone, 3,4-diamino-4'-ethylthiochalcone, 3,5-diamino-4'-ethylthiochalcone, 2-dimethylamino-4'-ethylthiochalcone, 3-dimethylamino 4'-ethylthiochalcone, 3,5-bis(dimethylamino)-4'-ethylthiochalcone, 3-bromo-4'-ethylthiochalcone, 3-nitro-4'-ethylthiochalcone, 3,5-dinitro-4'-ethylthiochalcone, 2-cyano-4'-ethylthiochalcone, 3-cyano-4'-ethylthiochalcone, 4-cyano-4'-ethylthiochalcone, 2,4 dicyano-4'-ethylthiochalcore, 3,4-dicyano-4'-ethylthiochalcone, 3-phenyl-4'-ethylthiochalcone, 4-phenyl 4'-ethylthiochalcone, 3,5-biphenyl-4'-ethylthiochalcone, 3-acetyl-4'-ethylthiochalcone, 4-acetyl-4'-ethylthiochalcone, 3,5diacetyl-4'-ethylthiochalcone, 3-methoxy-4'-ethylthiochalcone, 2,3-dimethoxy-4'-ethylthiochalcone, 2,4-methoxy-4'-ethylthiochalcone, 2,5-dimethoxy-4'-ethylthiochalcone, 2,6-dimethoxy-4'-ethylthiochalcone, 3,4-dimethoxy-4'-ethylthiochalcone, 3,5-dimethoxy-4'-ethylthiochalcone, 2,3,4-trimethoxy-4'-ethylthiochalcone, 2,3,5-trimethoxy-4'-ethylthiochalcone, 2,3,6-trimethoxy-4'-ethylthiochalcone, 2,4,5-trimethoxy-4'-ethylthiochalcone, 2,4,6-trimethoxy-4'-ethylthiochalcone, 3,4,5-trimethoxy-4'-ethylthiochalcone, 2,3,4,5-tetramethoxy-4'-ethylthiochalcone, 2,3,4,6-tetramethoxy-4'-ethylthiochalcone, 2,3,5,6-tetramethoxy-4'-ethylthiochalcone, 2,3,4,5,6-pentamethoxy-4'-ethylthiochalcone, 2-ethoxy-4'-ethylthiochalcone, 3-ethoxy-4'-propylthiochalcone, 4-ethoxy-4'-propylthiochalcone, 2,3-diethoxy-4'-propylthiochalcone, 2,4-diethoxy-4'-propylthiochalcone, 2,5-diethoxy-4'-propylthiochalcone, 2,6-diethoxy-4'-propylthiochalcone, 2,3,4-triethoxy-4'-propylthiochalcone, 2,3,5-triethoxy-4'-propylthiochalcone, 2,4,5-triethoxy-4'-propylthiochalcone, 2-propyloxy-4'-propylthiochalcone, 3-propyloxy-4'-propylthiochalcone, 4-propyloxy-4'-propylthiochalcone, 3,4-dipropyloxy-4'-propylthiochalcone, 3,5-dipropyloxy-4'-propylthiochalcone, 3,4,5-tripropyloxy-4'-propylthiochalcone, 2-butoxy-4'-propylthiochalcone, 3-butoxy-4'-propylthiochalcone, 4-butoxy-4'-propylthiochalcone, 3,4-dibutoxy-4'-propylthiochalcone, 3,5-dibutoxy-4'-propylthiochalcone, 3,4,5-tributoxy-4'-propylthiochalcone, 2-pentyloxy-4'-propylthiochalcone, 3-pentyloxy-4'-propylthiochalcone, 4-pentyloxy-4'-propylthiochalcone, 3,4-dipentyloxy-4'-propylthiochalcone, 3,5-dipentyloxy-4'-propylthiochalcone, 3,4,5-tripentyloxy-4'-propylthiochalcone, 2-hexyloxy-4'-propylthiochalcone, 3-hexyloxy-4'-propylthiochalcone, 4-hexyloxy-4'-propylthiochalcone, 3,4-dihexyloxy-4'-propylthiochalcone, 3,5-dihexyloxy-4'-propylthiochalcone, 3,4,5-trihexyloxy-4'-propylthiochalcone, 2-heptyloxy-4'-propylthiochalcone, 3-heptyloxy-4'-propylthiochalcone, 4-heptyloxy-4'-propylthiochalcone, 3,4-diheptyloxy-4'-propylthiochalcone, 3,5-diheptyloxy-4'-propylthiochalcone, 3,4,5-triheptyloxy-4'-propylthiochalcone, 2-octyloxy-4'-propylthiochalcone, 3-octyloxy-4'-propylthiochalcone, 4-octyloxy-4'-propylthiochalcone, 3,4-dioctyloxy-4'-propylthiochalcone, 3,5-dioctyloxy 4'-propylthiochalcone, 3,4,5-trioctyloxy-4'-propylthiochalcone, 2-nonyloxy-4'-propylthiochalcone, 3-nonyloxy-4'-propylthiochalcone, 4-nonyloxy-4'-propylthiochalcone, 3,4-dinonyloxy-4'-propylthiochalcone, 3,5-dinonyloxy-4'-propylthiochalcone, 3,4,5-trinonyloxy-4'-propylthiochalcone, 2-decyloxy-4'-propylthiochalcone, 3-decyloxy-4'-propylthiochalcone, 4-decyloxy-4'-propylthiochalcone, 3,4-didecyloxy-4'-propylthiochalcone, 3,5-didecyloxy-4'-propylthiochalcone, 3,4,5-tridecyloxy-4'-propylthiochalcone, 2-dodecyloxy-4'-propylthiochalcone, 3-dodecyloxy-4'-propylthiochalcone, 4-dodecyloxy-4'-propylthiochalcone, 3,4-didodecyloxy-4'-propylthiochalcone, 3,5-didodecyloxy-4'-propylthiochalcone, 3,4,5-tridodecyloxy-4'-propylthiochalcone, 2-tridecyloxy-4'-propylthiochalcone, 3-tridecyloxy-4'-propylthiochalcone, 4-tridecyloxy-4'-propylthiochalcone, 3,4-di(tridecyloxy)-4'-propylthiochalcone, 3,5-di(tridecyloxy)-4'-propylthiochalcone, 3,4,5-tri(tridecyloxy)-4'-propylthiochalcone, 2-tetradecyloxy-4'-propylthiochalcone, 3-tetradecyloxy-4'-propylthiochalcone, 4-tetradecyloxy-4'-propylthiochalcone, 3,4-di(tetradecyloxy)-4'-propylthiochalcone, 3,5-di(tetradecyloxy)-4'-propylthiochalcone, 3,4,5-tri(tetradecyloxy)-4'-propylthiochalcone, 2-pentadecyloxy-4'-propylthiochalcone, 3-pentadecyloxy-4'-propylthiochalcone, 4-pentadecyloxy-4'-propylthiochalcone, 3,4-di(pentadecyloxy)-4'-propylthiochalcone, 3,5-di(pentadecyloxy)-4'-propylthiochalcone, 3,4,5-tri(pentadecyloxy)-4'-propylthiochalcone, 2-hexadecyloxy-4'-propylthiochalcone, 3-hexadecyloxy-4'-propylthiochalcone, 4-hexadecyloxy-4'-propylthiochalcone, 3,4-di(hexadecyloxy)-4'-propylthiochalcone, 3,5-di(hexadecyloxy)-4'-propylthiochalcone, 3,4,5-tri(hexadecyloxy)-4'-propylthiochalcone, 2-heptadecyloxy-4'-propylthiochalcone, 3-heptadecyloxy-4'-propylthiochalcone, 4-heptadecyloxy-4'-propylthiochalcone, 3,4-di(heptadecyloxy)-4'-propylthiochalcone, 3,5-di(heptadecyloxy)-4'-propylthiochalcone, 3,4,5-tri(heptadecyloxy)-4'-propylthiochalcone, 2-octadecyloxy-4'-propylthiochalcone, 3-octadecyloxy-4'-propylthiochalcone, 4-octadecyloxy-4'-propylthiochalcone, 3,4-di(octadecyloxy)-4'-propylthiochalcone, 3,5-di(octadecyloxy)-4'-propylthiochalcone, 3,4,5-tri(octadecyloxy)-4'-propylthiochalcone, 3-nonadecyloxy-4'-propylthiochalcone, 4-nonadecyloxy-4'-propylthiochalcone, 3,4-di(nonadecyloxy)-4'-propylthiochalcone, 3,5-di(nonadecyloxy)-4'-propylthiochalcone, 3-eicosyloxy-4'-propylthiochalcone, 4-eicosyloxy-4'-propylthiochalcone, 3,4-di(eicosyloxy)-4'-propylthiochalcone, 3,5-di(eicosyloxy)-4'-propylthiochalcone, 3-heneicosyloxy 4'-propylthiochalcone, 4-heneicosyloxy-4'-propylthiochalcone, 3,5-di(heneicosyloxy)-4'-propylthiochalcone, 3-docosyloxy-4'-propylthiochalcone, 4-docosyloxy-4'-propylthiochalcone, 3,5-di(docosyloxy)-4'-propylthiochalcone, 3-dimethylamino-4'-methylthiochalcone, 3-cyano-4'-methylthiochalcone, 4-methoxy-4'-butylthiochalcone, 4-chloro-4'-octylthiochalcone, 3-bromo-4'-ethylthiochalcone and 4-bromo-4'-octadecylthiochalcone.

As has been described hereinabove, the chalcone derivatives of the invention as represented by the general formulae (I) and (II) exhibit exceedingly high non-linear optical effects, and extremely high transmittances and superior transparencies, so that it is possible to provide various optical materials by the present invention.

EXAMPLES

The present invention will be described more in detail with reference to Examples and Comparative Examples, but it should be noted here that the invention is not limited to the Examples set forth below.

EXAMPLE 1

Into a reaction vessel were charged 1.52 g (0.01 mol) of 4-methylthiobenzaldhyde and 1.20 g (0.01 mol) of acetophenone together with 20 ml of ethanol, and a mixed solution of 1 g of a 40% aqueous solution of sodium hydroxide and 10 ml of ethanol was dropwise added at 25° C. under agitation. After the completion of dropwise addition, the reaction proceeded for 30 minutes while maintaining the temperature at 25° C. After the reaction, 20 ml of a 0.5N aqueous hydrochloric acid solution was added and agitated to cease the reaction. A separated solid was filtered, rinsed with water several times and dried to obtain a crude product.

Figure 1:
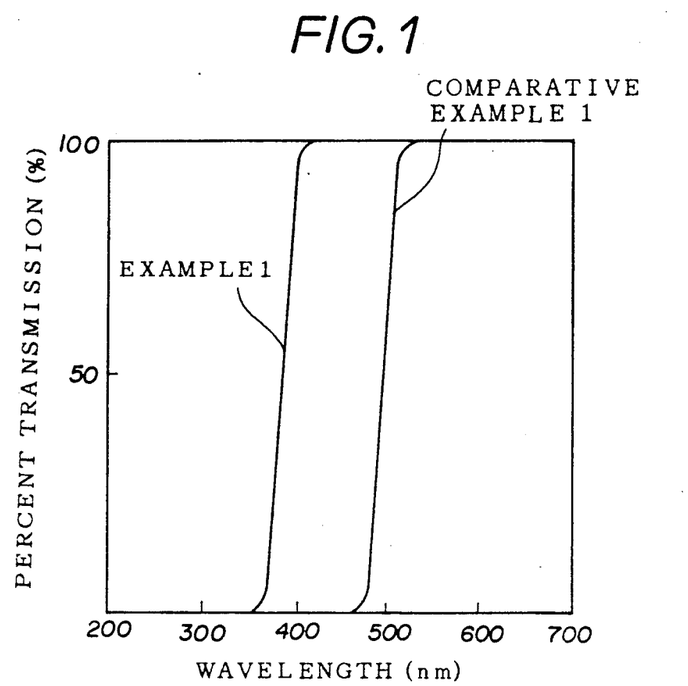
FIG. 1 is a graph showing the light absorption spectrum of a purified product of 4-methylthiochalcone which is one of the non-linear optical materials of this invention and the light absorption spectrum of a known non-linear optical material.

The crude product was recrystallized from ethanol to obtain 1.48 g of a purified product of 4-methylthiochalcone. The yield was 58%. The melting point was 83° C. The absorption spectrum of the purified 4-methylthiochalcone is shown in FIG. 1.

EXAMPLE 2

Into a reaction vessel were charged 1.52 g (0.01 mol) of 4-methylthiobenzaldhyde and 1.55 g (0.01 mol) of 4'-chloroacetophenone together with 30 ml of ethanol to proceed the reaction at 30° C. for an hour. Then, 20 ml of a 0.5N aqueous hydrochloric acid solution was added followed by agitation to cease the reaction, and a separated solid was filtered and rinsed with water several times.

The crude product was recrystallized from ethanol to obtain 1.30 g of a purified product of 4-methylthio-4'-chlorochalcone. The yield was 45%. The melting point was 149° C.

EXAMPLE 3

Following the procedure as described in Example 2, 1.52 g (0.01 mol) of 4-methylthiobenzaldehyde and 1.99 g (0.01 mol) of 4'-bromoacetophenone were charged, reacted and purified similarly, whereby 1.40 g of purified 4-methylthio-4'-bromochalcone was obtained. The yield was 42%. The melting point was 161° C.

EXAMPLE 4

Following the procedure described in Example 2, 1.52 g (0.01 mol) of 4-methylthiobenzaldehyde and 1.36 g (0.01 mol) of 4'-hydroxyacetophenone were charged, reacted and purified similarly, whereby 0.64 g of purified 4-methylthio-4'-hydroxychalcone was obtained. The yield was 24%. The melting point was 171° C.

EXAMPLE 5

Into a reaction vessel were charged 1.52 g (0.01 mol) of 4-methylthiobenzaldehyde and 1.35 g (0.01 mol) of 4'-aminoacetophenone together with 30 ml of ethanol, and a mixed solution of 1 g of a 40% aqueous solution of sodium hydroxide and 10 ml of ethanol was dropwise added at 25° C. under agitation. After the completion of dropwise addition, the reaction proceeded for 30 minutes while maintaining the temperature at 25° C. After the reaction, 50 ml of water was added and agitated, and a separated solid was filtered, rinsed with water several times and dried.

The crude product was recrystallized from a mixed solvent of ethanol/benzene=1/1 to obtain 1.15 g of a purified product of 4-methylthio-4'-aminochalcone. The yield was 43%. The melting point was 168° C.

EXAMPLE 6

Following the procedure as described in Example 2, 1.52 g (0.01 mol) of 4-methylthiobenzaldehyde and 1.65 g (0.01 mol) of 4'-nitroacetophenone were charged and reacted, followed by recrystallization from a mixed solvent of ethanol/benzene=1/1, to obtain 1.66 g of purified 4-methylthio-4'-nitrochalcone. The yield was 56%. The melting point was 159.5° C.

EXAMPLE 7

Following the procedure as described in Example 5, 1.52 g (0.01 mol) of 4-methylthiobenzaldehyde and 1.63 g (0.01 mol) of 4'-dimethylacetophenone were charged, reacted and purified similarly, whereby 1.28 g of purified 4-methylthio-4'-dimethylaminochalcone was obtained. The yield was 43%. The melting point was 150.5° C.

EXAMPLE 8

Following the procedure as described in Example 2, 1.52 g (0.01 mol) of 4-methylthiobenzaldehyde and 1.50 g (0.01 mol) of 4'-methoxyacetophenone were charged, reacted and purified similarly to obtain 1.18 g of purified 4-methylthio-4'-methoxychalcone. The yield was 42%. The melting point was 112.5° C.

EXAMPLE 9

Following the procedure as described in Example 2, 1.52 g (0.01 mol) of 4-methylthiobenzaldehyde and 1.64 g (0.01 mol) of 4'-ethoxyacetophenone were charged, reacted and purified similarly to obtain 1.31 g of purified 4-methylthio-4'-ethoxychalcone. The yield was 44%. The melting point was 107.5° C.

EXAMPLE 10

Into a reaction vessel were charged 1.52 g (0.01 mol) of 4-methylthiobenzaldehyde and 3.88 g (0.01 mol) of 4'-octadecyloxyacetophenone together with 40 ml of ethanol, and agitated at 50° C. to dissolve the materials to be reacted thoroughly. A mixed solution of 1 g of a 40% aqueous sodium hydroxide solution and 10 ml of ethanol was dropwise added into the reaction vessel, and then the admixture was allowed to react at a temperature of 40° C. for 8 hours. 20 ml of a 0.5N aqueous hydrochloric acid solution was then added, followed by agitation, to cease the reaction. A separated solid was filtered, rinsed with water several times and dried to obtain a crude product.

The crude product obtained was recrystallized from an ethanol solvent to obtain 4.00 g of purified 4-methylthio-4'-octadecyloxychalcone. The yield was 77%. The melting point was 104° C.

EXAMPLE 11

Following the procedure as described in Example 2, 1.52 g (0.01 mol) of 4-methylthiobenzaldehyde and 1.99 g (0.01 mol) of 3'-bromoacetophenone were charged, reacted and purified similarly to obtain 1.50 g of purified 4-methylthio-3'-bromochalcone. The yield was 45%. The melting point was 148° C.

EXAMPLE 12

Following the procedure as described in Example 6, 1.52 g (0.01 mol) of 4-methylthiobenzaldehyde and 1.65 g (0.01 mol) of 3'-nitroacetophenone were charged, reacted and purified similarly to obtain 1.75 g of purified 4-methylthio-3'-nitrochalcone. The yield was 59%. The melting point was 150° C.

EXAMPLES 13 TO 26

Compounds of Examples 13 to 26 as set forth below were synthesized following the procedure as described in Example 1 except that different derivatives of thiobenzaldehyde and/or derivatives of acetophenone were used as the starting materials.

EXAMPLE 13
4-methylthio-4'-fluorochalcone

EXAMPLE 14
4-methylthio-3'-chlorochalcone

EXAMPLE 15
4-methylthio-3',4'-dichlorochalcone

EXAMPLE 16
4-methylthio-4'-nonylchalcone

EXAMPLE 17
4-methylthio-4'-t-butylchalcone

EXAMPLE 18
4-ethylthio-4'-fluorochalcone

EXAMPLE 19
4-ethylthio-4'-chlorochalcone

EXAMPLE 20
4-ethylthio-4'-bromochalcone

EXAMPLE 21
4-ethylthio-3'-bromochalcone

EXAMPLE 22
4-ethylthio-4'-iodochalcone

EXAMPLE 23
4-butylthio-4'-bromochalcone

EXAMPLE 24
4-butylthio-4'-iodochalcone

EXAMPLE 25
4-octylthio-4'-chlorochalcone

EXAMPLE 26
4-octadecylthio-4'-bromochalcone

EXAMPLE 27

Second harmonic generations (SHG) of the derivatives of chalcone synthesized in Examples 1 to 26 and the derivatives of chalcone synthesized by similar processes were measured. The measuring method used involved the steps of putting each granulated sample having a diameter of 50 to 150 μm between slide glass plates, subjecting the sample to pulses of 15 nsec. from a Nd-YAG laser source (Wavelength: 1064 nm) fitted with a Q switch, and measuring the second harmonic wave generated from the sample. The standard sample used was urea which had been granulated similarly, and the SHG intensity ratio of each sample was determined when the SHG intensity of urea was set to 1. This measuring method has been well known to a person having ordinary skill in the art, and reference may be had, for example, to Journal of Applied Physics, vol. 36, pp 3798 to 3813 (1968).

The SHG intensity ratios of the derivatives of chalcone, according to the present invention, measured by the method described above are shown in Table 1.

TABLE 1

| | Structural Formula | Intensity Ratio of SHG |
|---|---|---|
| Example 1 | CH₃S—⟨C₆H₄⟩—CH=CH—C(=O)—⟨C₆H₅⟩ | 14.2 |
| Example 2 | CH₃S—⟨C₆H₄⟩—CH=CH—C(=O)—⟨C₆H₄⟩—Cl | 27.0 |
| Example 3 | CH₃S—⟨C₆H₄⟩—CH=CH—C(=O)—⟨C₆H₄⟩—Br | 26.5 |
| Example 4 | CH₃S—⟨C₆H₄⟩—CH=CH—C(=O)—⟨C₆H₄⟩—OH | 10.7 |
| Example 5 | CH₃S—⟨C₆H₄⟩—CH=CH—C(=O)—⟨C₆H₄⟩—NH₂ | 20.5 |
| Example 6 | CH₃S—⟨C₆H₄⟩—CH=CH—C(=O)—⟨C₆H₄⟩—NO₂ | 5.9 |
| Example 7 | CH₃S—⟨C₆H₄⟩—CH=CH—C(=O)—⟨C₆H₄⟩—N(CH₃)₂ | 8.7 |
| Example 8 | CH₃S—⟨C₆H₄⟩—CH=CH—C(=O)—⟨C₆H₄⟩—OCH₃ | 4.7 |
| Example 9 | CH₃S—⟨C₆H₄⟩—CH=CH—C(=O)—⟨C₆H₄⟩—OC₂H₅ | 5.0 |
| Example 10 | CH₃S—⟨C₆H₄⟩—CH=CH—C(=O)—⟨C₆H₄⟩—OC₁₈H₃₇ | 4.8 |
| Example 11 | CH₃S—⟨C₆H₄⟩—CH=CH—C(=O)—⟨C₆H₄⟩(3-Br) | 12.0 |
| Example 12 | CH₃S—⟨C₆H₄⟩—CH=CH—C(=O)—⟨C₆H₄⟩(3-NO₂) | 15.4 |
| Example 13 | CH₃S—⟨C₆H₄⟩—CH=CH—C(=O)—⟨C₆H₄⟩—F | 10.5 |

TABLE 1-continued

| | Structural Formula | Intensity Ratio of SHG |
|---|---|---|
| Example 14 | CH$_3$S–⟨Ph⟩–CH=CH–C(=O)–⟨Ph⟩–Cl (3-Cl) | 35.0 |
| Example 15 | CH$_3$S–⟨Ph⟩–CH=CH–C(=O)–⟨Ph⟩(3-Cl, 4-Cl) | 6.8 |
| Example 16 | CH$_3$S–⟨Ph⟩–CH=CH–C(=O)–⟨Ph⟩–C$_9$H$_{19}$ | 9.5 |
| Example 17 | CH$_3$S–⟨Ph⟩–CH=CH–C(=O)–⟨Ph⟩–C(CH$_3$)$_3$ | 9.0 |
| Example 18 | C$_2$H$_5$S–⟨Ph⟩–CH=CH–C(=O)–⟨Ph⟩–F | 20.0 |
| Example 19 | C$_2$H$_5$S–⟨Ph⟩–CH=CH–C(=O)–⟨Ph⟩–Cl | 5.1 |
| Example 20 | C$_2$H$_5$S–⟨Ph⟩–CH=CH–C(=O)–⟨Ph⟩–Br | 5.9 |
| Example 21 | C$_2$H$_5$S–⟨Ph⟩–CH=CH–C(=O)–⟨Ph⟩–Br (3-Br) | 12.7 |
| Example 22 | C$_2$H$_5$S–⟨Ph⟩–CH=CH–C(=O)–⟨Ph⟩–I | 15.1 |
| Example 23 | C$_4$H$_9$S–⟨Ph⟩–CH=CH–C(=O)–⟨Ph⟩–Br | 12.6 |
| Example 24 | C$_4$H$_9$S–⟨Ph⟩–CH=CH–C(=O)–⟨Ph⟩–I | 12.3 |
| Example 25 | C$_8$H$_{17}$S–⟨Ph⟩–CH=CH–C(=O)–⟨Ph⟩–Cl | 11.5 |

TABLE 1-continued

| | Structural Formula | Intensity Ratio of SHG |
|---|---|---|
| Example 26 | C$_{18}$H$_{37}$S—⟨phenyl⟩—CH=CH—C(=O)—⟨phenyl⟩—Br | 14.2 |
| Urea | H$_2$N—C(=O)—NH$_2$ | 1.0 |

COMPARATIVE EXAMPLE 1

Using 2-methyl-4-nitroaniline which was a known non-linear optical material, the light absorption spectrum was measured. The results are shown in FIG. 1.

As will be apparent from FIG. 1, the chalcone derivatives had substantially 100% transmissions for visible light having wavelengths of not less than 400 nm to reveal that they were essentially transparent. On the contrary, 2-methyl-4-nitroanilne, the known non-linear optical material, absorbed visible light having wavelengths of not more than 500 nm to hinder transmission of the light.

EXAMPLE 28

Into a reaction vessel were charged 1.66 g (0.01 mol) of 4'-methylthioacetophenone and 1.85 g (0.01 mol) of 3-bromobenzaldehyde together with 20 ml of ethanol, and under agitation added dropwise was a mixed solution of 1 g of a 40% aqueous solution of sodium hydroxide and 10 ml of ethanol at 20° C. After the completion of dropwise addition, the reaction proceeded for 30 minutes while maintaining the temperature at 20° C. Then, 20 ml of a 0.5N aqueous hydrochloric acid solution was added and agitated to cease the reaction, and then a separated solid was filtered to obtain a solid material which was rinsed with water several times and dried to obtain a crude product.

Figure 2:
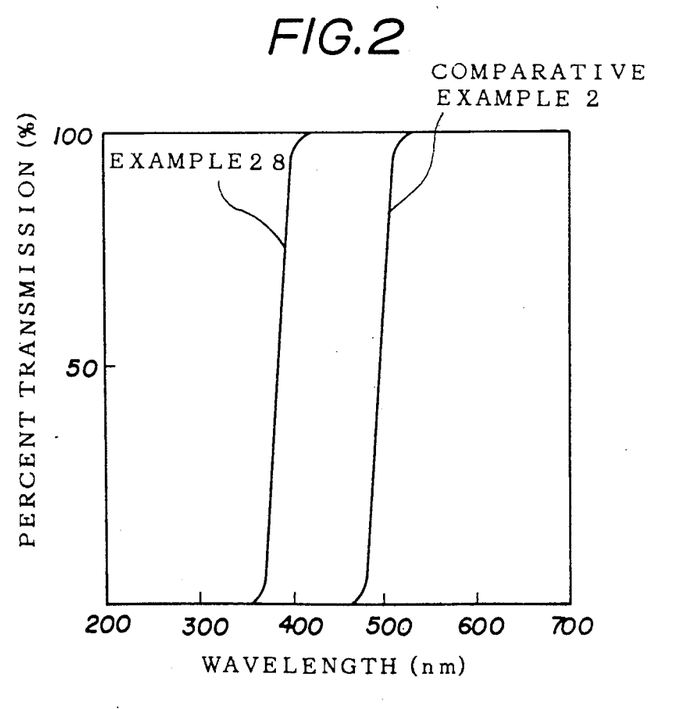
FIG. 2 is a graph showing the light absorption spectrum of a purified product of 3-bromo-4'-methylthiochalcone which is one of the non-linear optical materials of this invention and the light absorption spectrum of a known non-linear optical material.

The crude product was recrystallized from an ethanol solvent to obtain 2.36 g of a purified product of 3-bromo-4'-methylthiochalcone. The yield was 71%. The melting point was 180° C. The absorption spectrum of the aforementioned purified 3-bromo-4'-methylthiochalcone is shown in FIG. 2.

EXAMPLES 29 TO 42

Compounds of Examples 29 to 42 as set forth below were synthesized following the procedure as described in Example 1 except that different derivatives of thioacetophenone and/or derivatives of benzaldehyde were used as the starting materials:

EXAMPLE 29
3-methoxy-4'-methylthiochalcone

EXAMPLE 30
4-methylthiochalcone

EXAMPLE 31
3-dimethylamino-4'-methylthiochalcone

EXAMPLE 32
4-bromo-4'-methylthiochalcone

EXAMPLE 33
3-chloro-4'-methylthiochalcone

EXAMPLE 34
3-octadecyl-4'-methylthiochalcone

EXAMPLE 35
3-fluoro-4'-methylthiochalcone

EXAMPLE 36
3-methyl-4'-methylthiochalcone

EXAMPLE 37
2,6-dimethoxy-4'-methylthiochalcone

EXAMPLE 38
3-cyano-4'-methylthiochalcone

EXAMPLE 39
3-bromo-4'-ethylthiochalcone

EXAMPLE 40
4-methoxy-4'-butylthiochalcone

EXAMPLE 41
4-chloro-4'-octylthiochalcone

EXAMPLE 42
4-bromo-4'-octadecylthiochalcone

EXAMPLE 43

Second harmonic generations (SHG) of the derivatives of chalcone synthesized in Examples 28 to 42 were measured similarly as in Example 27. The results are shown in Table 2.

COMPARATIVE EXAMPLE 2

Using 2-methyl-4-nitroaniline which was a known non-linear optical material, the light absorption spectrum was measured. The result is shown in FIG. 2.

TABLE 2

| | Structural Formula | Intensity Ratio of SHG |
|---|---|---|
| Example 28 | Br–C₆H₄–CH=CH–C(=O)–C₆H₄–SCH₃ | 29.0 |
| Example 29 | CH₃O–C₆H₄–CH=CH–C(=O)–C₆H₄–SCH₃ | 23.5 |
| Example 30 | C₆H₅–CH=CH–C(=O)–C₆H₄–SCH₃ | 16.0 |
| Example 31 | (CH₃)₂N–C₆H₄–CH=CH–C(=O)–C₆H₄–SCH₃ | 10.2 |
| Example 32 | Br–C₆H₄–CH=CH–C(=O)–C₆H₄–SCH₃ | 10.0 |
| Example 33 | Cl–C₆H₄–CH=CH–C(=O)–C₆H₄–SCH₃ | 18.0 |
| Example 34 | C₁₈H₁₇–C₆H₄–CH=CH–C(=O)–C₆H₄–SCH₃ | 10.5 |
| Example 35 | F–C₆H₄–CH=CH–C(=O)–C₆H₄–SCH₃ | 12.3 |
| Example 36 | CH₃–C₆H₄–CH=CH–C(=O)–C₆H₄–SCH₃ | 12.5 |
| Example 37 | 2,6-(OCH₃)₂–C₆H₃–CH=CH–C(=O)–C₆H₄–SCH₃ | 9.5 |
| Example 38 | CN–C₆H₄–CH=CH–C(=O)–C₆H₄–SCH₃ | 11.0 |

TABLE 2-continued

| | Structural Formula | Intensity Ratio of SHG |
|---|---|---|
| Example 39 | Br–⌬–CH=CH–C(=O)–⌬–SC$_2$H$_5$ | 13.5 |
| Example 40 | CH$_3$O–⌬–CH=CH–C(=O)–⌬–SC$_4$H$_9$ | 9.6 |
| Example 41 | Cl–⌬–CH=CH–C(=O)–⌬–SC$_8$H$_{17}$ | 13.0 |
| Example 42 | Br–⌬–CH=CH–C(=O)–⌬–SC$_{18}$H$_{37}$ | 14.5 |

We claim:

1. In a non-linear optical device in which an organic compound is disposed in a light beam, the improvement in which the organic compound is a derivative of chalcone represented by the following general formula wherein $R_1$ is a halogen atom, a hydroxyl group, an amino group, a dimethylamino group, a nitro group, a cyano group, a phenyl group, an alkyl group having 1 to 18 carbon atoms or an alkyloxy group having 1 to 22 carbon atoms; $n_1$ is an integer of from 0 to 21; and $m_1$ is an integer of from 0 to 5.

2. The non-linear optical device as claimed in claim 1, wherein said derivative of chalcone is selected from the group consisting of 4methylthiochalcone, 4-methylthio-4'-chlorochalcone, 4-methylthio-4'-bromochalcone, 4-methylthio-4'-hydroxychalcone, 4-methylthio-4'-aminochalcone, 4-methylthio-4'-nitrochalcone, 4-methylthio-4'-dimethylaminochalcone, 4-methylthio-4'-methoxychalcone, 4-methylthio-4'-ethoxychalcone, 4-methylthio-4'-octadecyloxychalcone, 4-methylthio-3'-bromochalcone, 4-methylthio-3'-nitrochalcone, 4-methylthio-4'-fluorochalcone, 4-methylthio-3'-chlorochalcone, 4-methylthio-3',4'-dichlorochalcone, 4-methylthio-4'-nonylchalcone, 4-methylthio-4'-t-butylchalcone, 4-ethylthio-4'-fluorochalcone, 4-ethylthio-4'-chlorochalcone, 4-ethylthio-4'-bromochalcone, 4-ethylthio-3'-bromochalcone, 4-ethylthio-4'-iodochalcone, 4-butylthio-4'-bromochalcone, 4-butylthio-4'-iodochalcone, 4-octylthio-4'-chlorochalcone and 4-octadecylthio-4'-bromochalcone.

3. The non-linear optical device as claimed in claim 1, wherein said derivative of chalcone represented by the general formula is prepared by a condensation reaction between a derivative of thiobenzaldehyde and acetophenone or a derivative thereof.

4. The non-linear optical device as claimed in claim 3, wherein said condensation reaction is carried out within a temperature range of from 0° to 50° C.

* * * * *